(12) United States Patent
Matsusaka et al.

(10) Patent No.: US 9,027,905 B2
(45) Date of Patent: May 12, 2015

(54) FLUID CONTROL VALVE

(75) Inventors: Masanobu Matsusaka, Handa (JP);
Tadayoshi Sato, Chita-gun (JP)

(73) Assignee: Aisin Seiki Kabushiki Kaisha,
Kariya-Shi, Aichi (JP)

( * ) Notice: Subject to any disclaimer, the term of this patent is extended or adjusted under 35 U.S.C. 154(b) by 0 days.

(21) Appl. No.: 13/821,358

(22) PCT Filed: Oct. 12, 2011

(86) PCT No.: PCT/JP2011/073413
§ 371 (c)(1),
(2), (4) Date: Mar. 7, 2013

(87) PCT Pub. No.: WO2012/060188
PCT Pub. Date: May 10, 2012

(65) Prior Publication Data
US 2013/0161548 A1 Jun. 27, 2013

(30) Foreign Application Priority Data

Nov. 2, 2010 (JP) .................................. 2010-246377
Nov. 2, 2010 (JP) .................................. 2010-246378

(51) Int. Cl.
*F16K 31/02* (2006.01)
*F01P 7/16* (2006.01)
(Continued)

(52) U.S. Cl.
CPC .............. *F01P 7/16* (2013.01); *F01P 2007/146* (2013.01); *F16K 31/0651* (2013.01); *F01P 2060/08* (2013.01)

(58) Field of Classification Search
USPC .......... 137/535, 538, 543.17, 543.21; 251/65, 251/129.21, 129.22
See application file for complete search history.

(56) References Cited

U.S. PATENT DOCUMENTS 3,433,256 A * 3/1969 Tobler et al. ............. 251/129.21
4,880,206 A * 11/1989 Lungu ...................... 251/129.21
(Continued)

FOREIGN PATENT DOCUMENTS

CN  201521701 U  7/2010
DE  39 20 893 A1  1/1991
(Continued)

OTHER PUBLICATIONS

Notification of Transmittal of Translation of the International Preliminary Report on Patentability (Chapter I or Chapter II)(PCT/IB/338) and International Preliminary Report on Patentability (Form PCT/IB/373) and Written Opinion of the International Searching Authority for International (Translation)(Form PCT/ISA/237) issued on May 23, 2013, in corresponding International Application No. PCT/JP2011/073413. (6 pages).
(Continued)

*Primary Examiner* — Kevin Lee
*Assistant Examiner* — P. Macade Nichols
(74) *Attorney, Agent, or Firm* — Buchanan Ingersoll & Rooney PC

(57) ABSTRACT

A fluid control valve includes an inflow channel for introducing fluid, an outflow channel for discharging the fluid, a valve seat, a valve body for blocking/allowing communication between the inflow channel and the outflow channel in association with a movement thereof into contact with or away from the valve seat, and a solenoid configured to apply a magnetic force to the valve body, the magnetic force being generated in response to supply of electric power to the solenoid. The inflow channel is formed through the core of the solenoid so that the core and the fluid comes into contact with each other in the inflow channel.

7 Claims, 3 Drawing Sheets

(51) Int. Cl.
*F16K 31/06* (2006.01)
*F01P 7/14* (2006.01)

(56) References Cited

U.S. PATENT DOCUMENTS

| | | |
|---|---|---|
| 6,966,278 B2 | 11/2005 | Takahashi |
| 2004/0089353 A1 | 5/2004 | Soga et al. |
| 2010/0095616 A1 | 4/2010 | Braasch |
| 2013/0020513 A1 | 1/2013 | Matsusaka et al. |

FOREIGN PATENT DOCUMENTS

| | | |
|---|---|---|
| JP | 53-47026 A | 4/1978 |
| JP | 56-10563 U | 1/1981 |
| JP | 57-168017 A | 10/1982 |
| JP | 2002-340219 A | 11/2002 |
| JP | 2003-328753 A | 11/2003 |
| JP | 2004-162770 A | 6/2004 |
| JP | 2010-095994 A | 4/2010 |
| WO | 87/05981 A1 | 10/1987 |

OTHER PUBLICATIONS

International Search Report (PCT/ISA/210) issued on Nov. 15, 2011, by the Japanese Patent Office as the International Searching Authority for International Application No. PCT/JP2011/073413.

Written Opinion (PCT/ISA/237) issued on Nov. 15, 2011, by the Japanese Patent Office as the International Searching Authority for International Application No. PCT/JP2011/073413.

Office Action (Notification of the First Office Action) Issued Dec. 4, 2013, by the Chinese Patent Office in corresponding Chinese Patent Application No. 201180043102.6, and an English Translation of the Office Action. (14 pages).

Extended European Search Report Issued Dec. 11, 2013, by the European Patent Office in corresponding European Patent Application No. 11837839.7. (5 pages).

* cited by examiner

FLUID CONTROL VALVE

TECHNICAL FIELD

The present invention relates to a fluid control valve, more particularly to a fluid control valve for controlling the flow of cooling water in a vehicle.

BACKGROUND ART

Conventionally, a vehicle mounts a cooling device that circulates a cooling water for cooling an internal combustion engine such as an engine, between the engine or the like and a radiator. And, such cooling device is sometimes provided with a fluid control valve for controlling the flow of the cooling water for the sake of controlling the temperature of cooling water.

For instance, Patent Document 1 discloses an electronically controlled thermostat as an example of such fluid control valve. This electronically controlled thermostat disclosed in Patent Document 1 is provided with a thermo element having a piston for opening/closing a valve body, so that with transfer of the temperature of the cooling water at the exit of the radiator to an element temperature-sensitive portion of the thermo element, opening/closing of the valve body is realized. Thus, the arrangement can realize opening/closing of the valve body without provision of a sensor or the like for detecting the temperature of cooling water.

However, with the electronically controlled thermostat disclosed in Patent Document 1, the heat of cooling water heated by the engine is discharged from a heat-sensing chamber, so that there is the possibility of sufficient heat being not transferred to the element temperature-sensitive portion. In such case, delay will occur in the opening of the valve body, disadvantageously.

In order to solve the above problem, it is conceivable to employ an electromagnetic valve disclosed in Patent Document 2 as the fluid control valve. With the electromagnetic valve of Patent Document 2, a movable core is mounted inside a coil. As the movable core is moved in response to electric power supply to the coil, opening/closing of the valve is controlled. Therefore, with an arrangement for controlling the power supply to the coil according to the temperature of the fluid, there can be provided a fluid control valve having good temperature followability or sensitivity for a change in the temperature of the fluid.

CITATION LIST

Patent Literature

Patent Document 1: Japanese Unexamined Patent Application Publication No. 2003-328753
Patent Document 2: Japanese Unexamined Patent Application Publication No. 2002-340219

SUMMARY OF INVENTION

Technical Problem

As described above, with use of the electromagnetic valve disclosed in Patent Document 2, it is possible to provide a fluid control valve having good followability. However, when an electric current is applied to the coil for magnetic force generation, heat will be generated from the coil, thus causing a problem of discharging this heat. If a cooling device is provided separately in order to discharge the heat from the coil, this will invite physical enlargement and weight increase of the fluid control valve, disadvantageously.

Further, in the case of using the electromagnetic value of Patent Document 2 as a fluid control valve for a large amount of fluid such as cooling water for cooling an engine or the like, the valve opening/closing operation needs to be effected against a significant hydraulic pressure of the fluid. And, high sealing performance will be required also. This could be realized by way of increase of the magnetic force. In such case; however, there arises the need of enlarging the other components such as the coil. Hence, this will again invite physical enlargement and weight increase of the fluid control valve, disadvantageously.

The present invention has been made in view of the above-described problem and its object is to provide a fluid control valve that can be used for a large amount of fluid without needing enlargement of the valve.

Solution to Problem

For solving the above-noted problem, a fluid control valve incorporated in a circulatory flow passageway for circulating fluid between an engine and a heat exchanger, the fluid control valve comprising:
  an inflow channel for introducing the fluid;
  an outflow channel for discharging the fluid;
  a valve seat;
  a valve body for blocking/allowing communication between the inflow channel and the outflow channel in association with a movement thereof into contact with or away from the valve seat; and
  a solenoid configured to apply a magnetic force to the valve body, the magnetic force being generated in response to supply of electric power to the solenoid;
  wherein the inflow channel is formed through a core of the solenoid so that the core and the fluid come into contact with each other in the inflow channel.

In general, as the temperature of the coil of the solenoid rises, the electric resistance becomes higher. Therefore, in order for a solenoid under a high temperature condition to generate a same intensity of magnetic force as that of the solenoid under a low temperature condition, it will be needed either to increase the current to be applied thereto or to increase the number of turns of the coil. However, these arrangements are not desirable as they invite increase of power consumption or enlargement of the fluid control valve. For this reason, according to the inventive arrangement described above, an inflow channel for introducing fluid to the interior of the fluid control valve is formed through a core of the solenoid so that the core comes into contact with the fluid within the inflow channel. This facilitates escape of heat generated from the coil into the fluid, so that temperature rise of the coil can be effectively restricted. Therefore, it is possible to generate the magnetic force needed for controlling the valve body without inviting increase of power consumption or enlargement of the fluid control valve.

According to one preferred embodiment of the fluid control valve of the present invention, the valve seat is comprised of the core.

With this arrangement, the inflow channel is formed through the core of the solenoid, which core constitutes a valve seat. Accordingly, when the valve body blocks communication between the inflow channel and the outflow channel, the valve body comes into contact with the core alone. Thus, the sealing performance can be improved. Moreover, as the pressure receiving area of the fluid is formed smaller, it is possible to decrease the magnetic force to be applied to the valve body. Since the amount of magnetic force depends on the number of turns of the coil of the solenoid and the amount of current, the possibility of decrease of magnetic force can contribute to power consumption saving and compactization of the fluid control valve.

According to one preferred embodiment of the fluid control valve of the present invention, the solenoid includes a yoke disposed radially outward as seen in an axial direction of the core; and an end face of the core on the side of the valve body protrudes more toward the valve body than an end face of the yoke on the side of the valve body. According to another preferred embodiment of the present invention of the fluid control valve of the present invention, the core side end face of the valve body includes a convex portion which comes into contact with the core.

With these arrangements, the valve body contact only the core, and the core can function as a valve seat.

According to another preferred embodiment of the fluid control valve of the present invention, the valve body includes a flow channel more radially outwards than the valve seat as seen in the axial direction of the core.

According to another preferred embodiment of the fluid control valve of the present invention, in response to electric power supply to the solenoid, the solenoid generates a magnetic flux which affects the core and the valve body; and the core and the valve body are cooled as coming into direct contact with the fluid.

Advantageous Effects of Invention

With the fluid control valve according to the present invention, there is no need for enlarging the device even when it is applied to a large amount of fluid.

DESCRIPTION OF EMBODIMENTS

Figure 1:
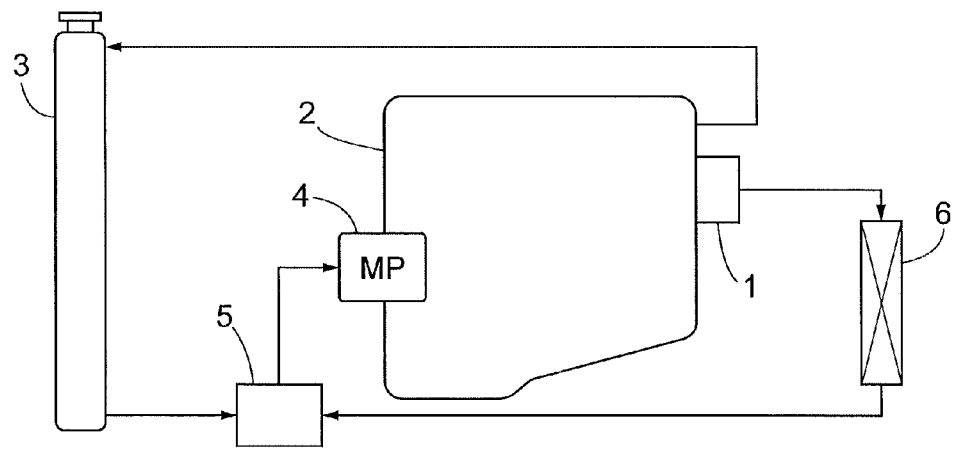
[FIG. 1] is a diagram showing an engine cooling system using a fluid control valve according to the present invention.

Next, with reference to the accompanying drawings, the fluid control valve according to the present invention will be described. FIG. 1 is a diagram showing an engine cooling system using the fluid control valve according to the present invention. An engine 2 has two routes of outflow passageway for cooling water (fluid), one being connected to a radiator 3, the other being connected to a heater core 6 (an example of a "heat exchanger" in the invention).

The outflow channel from the radiator 3 is connected to a thermostat valve 5. The outflow channel from the thermostat valve 5 is connected to a water pump 4. Further, the outflow channel from the water pump 4 is connected to an inflow channel to the engine 2. With these flow channels, cooling water heated by the engine 2 is introduced to the radiator 3 and cooled therein, and this cooled water is caused to flow through the thermostat valve 5 and the water pump 4 back to the engine 2.

On the other hand, the flow channel from the engine 2 to the heater core 6 incorporates a fluid control valve 1. The outflow channel from the core heater 6 is connected to another inflow channel to the thermostat valve 5. With these flow channels, the water heated by the engine 2 is introduced to the heater core 6 via the fluid control valve 1, so that the heater core 6 heats air present inside the vehicle, and the resultant cooled water is then caused to flow back to the engine 2 via the thermostat valve 5 and the water pump 4.

The fluid control valve 1 according to the present invention is incorporated in the flow channel from the engine 2 to the heater core 6 as described above and used for controlling outflow of the cooling water to the heater core 6. The inventive fluid control valve 1 is closed in the absence of hydraulic pressure developed in the cooling water and is opened in response to hydraulic pressure developed in the cooling water. The fluid control valve 1 is kept under the closed state with electric power supply to the fluid control valve 1. More particularly, the fluid control valve functions as follows.

Before the engine is started in response to a driver's operation of an ignition key or the like, namely, before the water pump 4 is activated, electric power is supplied to the fluid control valve 1. As described hereinbefore, the fluid control valve 1 is kept under the closed state in the absence of hydraulic pressure developed in the cooling water. But, with electric power supply to the valve 1 under the closed state, this closed state can be maintained even if there develops a hydraulic pressure thereafter. With this, no cooling water will flow to the heater core 6, so that the cooling water can be heated more speedily. Further, when the temperature of the cooling water is low, the thermostat valve 5 too is closed, so that no cooling water will flow to the radiator 3 either, so that the temperature of the cooling water can be raised even more speedily. As the temperature of the cooling water is raised speedily as described above, the temperature rise of engine oil or the like too can be sped up, thus contributing to improvement in fuel consumption efficiency.

Thereafter, when the temperature of the cooling water reaches a predetermined temperature (completion of warming-up operation), the electric power supply to the fluid control valve 1 is stopped. With this, the hydraulic pressure of the cooling water renders the fluid control valve 1 into the opened state, so that cooling water flows out toward the heater core 6.

Figure 2:
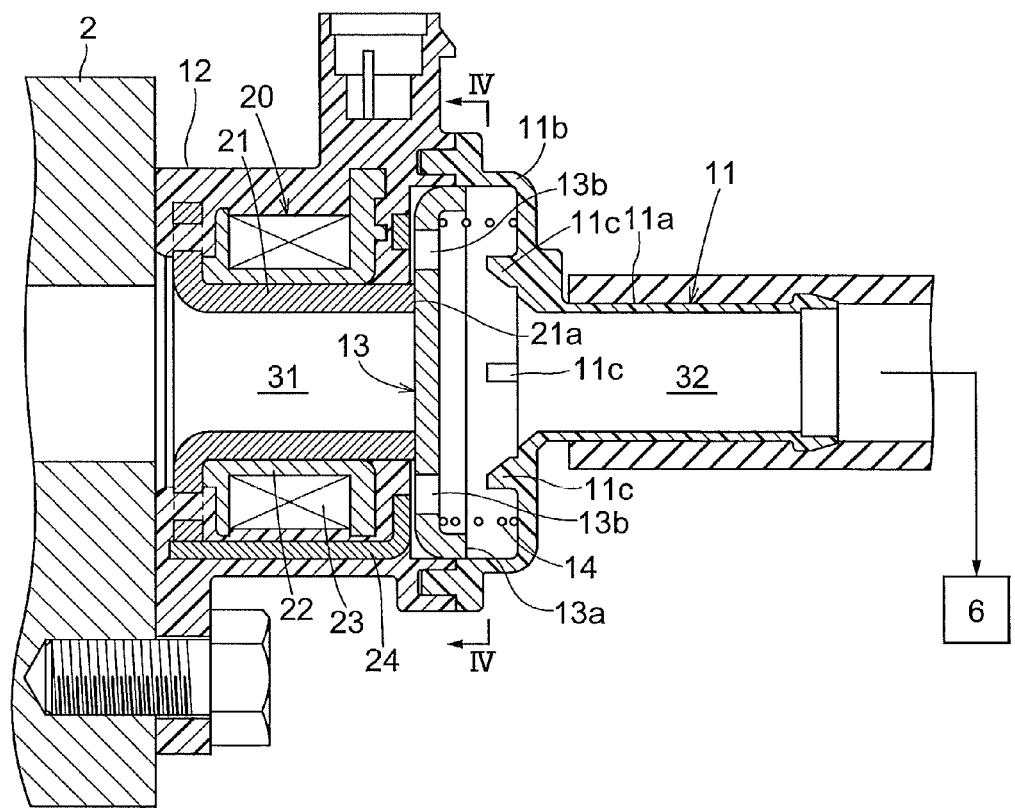
[FIG. 2] is a section view showing the fluid control valve of the present invention under a closed state thereof.
Figure 3:
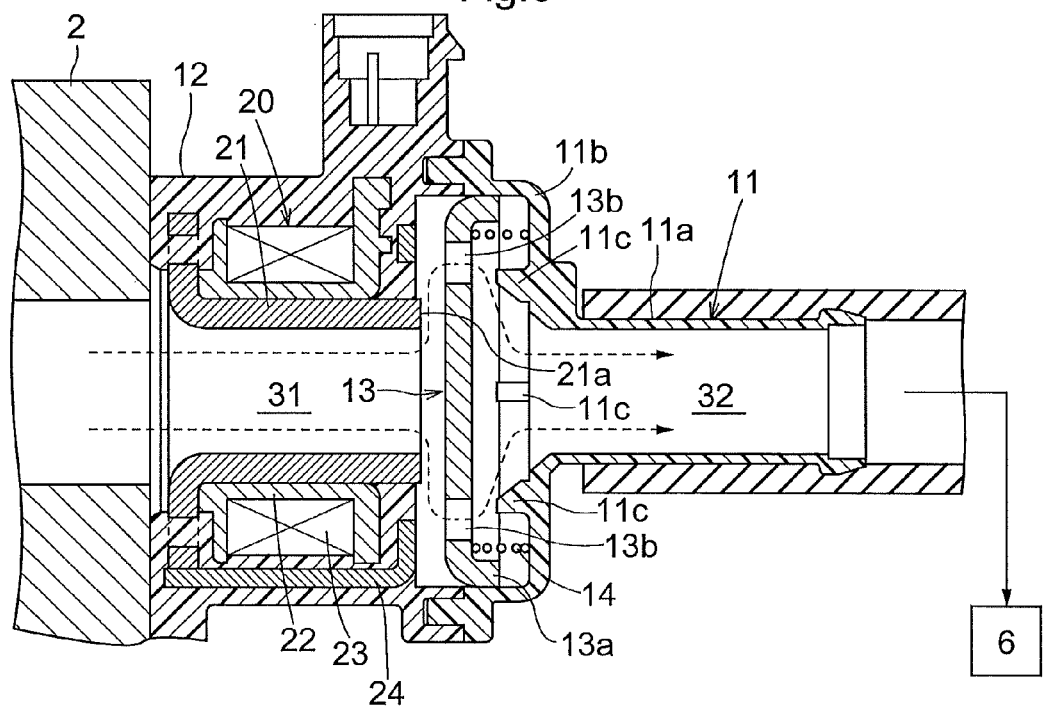
[FIG. 3] is a section view showing the fluid control valve of the present invention under an opened state thereof.

FIG. 2 is a section view of the fluid control valve 1 according to the present invention. The housing of this fluid control valve 1 is formed by securing a first housing 11 to a second housing 12. The second housing 12 houses therein a solenoid 20.

The solenoid 20 includes a core 21, a bobbin 22, a coil 23 and a yoke 24. The core 21 is comprised of a ferromagnetic body of iron, magnetic steel or the like and has a hollow tubular shape, i.e. a cylindrical shape as shown in FIG. 2. This hollow portion of the core 21 constitutes an inflow channel 31 for introducing cooling water to the inside of the fluid control valve 1, to which inflow channel 31 there is connected the flow channel from the engine 2. Further, this core 21 is configured to function as a "valve seat" as will be described later.

Further, the bobbin 22 is provided with a length of coil 23 wound around it with the core 21 being inserted therein. The yoke 24 is provided radially outwardly of the bobbin 22. As the material for forming the yoke 24, iron, magnetic steel or the like is employed.

In response to electric power supply to this coil 23 from a power source (not shown), magnetism (magnetic flux) is developed in the solenoid 20. The generated magnetism passes from the core 21 to the yoke 24 via a plunger 13. Therefore, as the plunger 13 (to be described later) acting as a "valve body" is attracted to the core 21 constituting a "valve seat", the fluid control valve 1 can be maintained under the closed state (the state of blocked communication between an inflow channel 31 and an outflow channel 32) even if a hydraulic pressure is developed in the cooling water. Incidentally, the fluid control valve 1 of the present invention remains under the closed state in the absence of development of hydraulic pressure in the cooling water (initial state) and the solenoid 20 is maintained under the closed state even after development of hydraulic pressure of the cooling water. Hence, as compared with a fluid control valve which is shifted from an opened state to a closed state by the magnetic force of the solenoid 20, the components constituting the solenoid 20 such as the coil 23 can be formed small.

In general, in accordance as the temperature of the coil 23 rises, the electric resistance becomes higher. Therefore, in order to equate the magnetic force of the coil 23 under a high temperature condition with the magnetic force of the coil 23 under a low temperature condition, it is necessary either to increase the current to be applied to the coil 23 under the high temperature condition or to increase the number of turns of the coil 23 having a high resistance. However, these arrangements are not desirable as they invite increase of power consumption or physical enlargement of the solenoid 20. As a solution to these problems, it is conceivable to cool the coil 23. Then, in the instant embodiment, the inflow channel 31 is formed inside the core 21. Moreover, coating is not provided to at least the inner wall surface (the wall surface of the inflow channel 31) of the core 21 which is coated at the remaining portion thereof with a resin or the like so that the material forming the core 21 body may come into contact with the cooling water. With this arrangement, heat generated at the time of power supply to the coil 23 may be readily transferred via the core 21 to the cooling water flowing in the inflow channel 31, whereby rise of the temperature of the coil 23 can be effectively prevented.

The first housing 11 is formed as a first hollow tubular portion 11a and a second tubular portion 11b having a greater radius than the first tubular portion 11a are integrated together with the respective axes thereof being aligned. When the first housing 11 and the second housing 12 are to be secured to each other, the second tubular portion 11b will be secured to the second housing 12. Incidentally, the hollow portion of the first tubular portion 11a constitutes an outflow channel 32 for discharging the cooling water to the outside of the fluid control valve 1 and this outflow channel 32 is connected to the inflow channel to the thermostat valve 5.

Further, inside (within the hollow portion) of the second tubular portion 11b, there are mounted the plunger 13 as a valve body formed of a magnetic material such as iron and an urging spring 14 for urging the plunger 13 toward the core 21. As the plunger 13 functions as a valve body, the face of the plunger 13 on the side of the core 21 (this face will be referred to as "the bottom face" hereinafter) is polished in order to obtain higher degree of firm contact with the core 21. When the hydraulic pressure of the cooling water is low, the plunger 13 as a valve body comes into contact with the plunger 13 side end face of the core 21 as a valve seat 21a, so that the fluid control valve 1 is set under a closed state (see FIG. 2). Incidentally, when the fluid control valve 1 is used under a posture with its core 21 being positioned on the upper side, the plunger 13 and the core 21 will contact each other due to the weight of the plunger 13. Hence, the urging spring 14 can be omitted in that case.

On the other hand, when the hydraulic pressure of cooling water overwhelms the urging force of the urging spring 14, this hydraulic pressure causes the plunger 13 to move in the direction away from the core 21, thus releasing the contact between this plunger 13 and the core 21. In the course of this, the first housing 11 side face of the plunger 13 comes into contact with a movement restricting portion 11c projecting toward the plunger 13 which portion 11c is provided in the inner wall face of the second tubular portion 11b facing the plunger 13. With this, the upper face of the plunger 13 is brought into a position at which the face does not contact the inner wall face of the second tubular portion 11b, but keeps a predetermined distance relative thereto.

Figure 4:
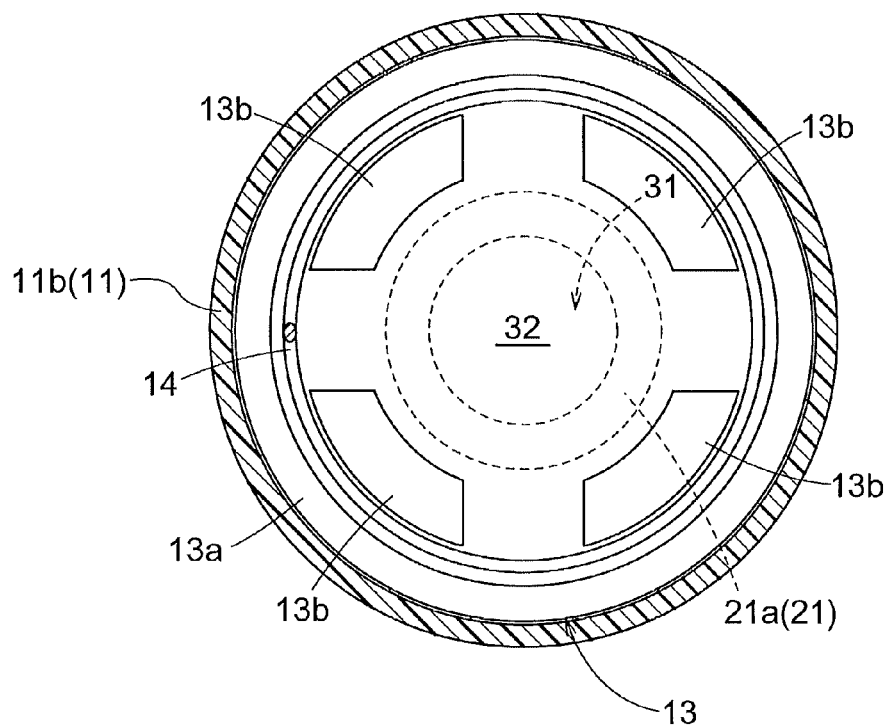
[FIG. 4] is a plan view of a plunger of the fluid control valve of the present invention.

The plunger 13 in this embodiment, as shown in FIG. 4, includes four flow channels 13b radially outward of the radius of the core 21. Therefore, when the plunger 13 is moved in the direction away from the core 21 due to the hydraulic pressure of cooling water, the plunger 13 will be located at the position spaced by a predetermined distance from the inner wall face of the second tubular portion 11b as described above, so that communication is established between the inflow channel 31 and the outflow channel 32 via the flow channels 13b (establishment of a valve opened state). Namely, in association with the movement of the plunger 13 in the direction away from the core 21, the fluid control valve 1 is rendered into the valve opened state.

As described above, by forming the flow channels 13b in the plunger 13 as the valve body, it becomes unnecessary to provide any flow channels radially outwardly of the plunger 13. As a result, the fluid control valve 1 can be formed compact.

Further, as shown in FIG. 4, the four flow channels 13b are formed equidistantly on a same circle located more radially outward than the core 21, as seen in the plan view. Therefore, the hydraulic pressure of cooling water can be applied uniformly to the bottom face (the core 21 side face) of the plunger 13, whereby the posture of the plunger 13 can be stable even in the presence if any of pulsatory variations in the hydraulic pressure of cooling water. As a result, it is possible to restrict occurrence of frictional wear of a guide portion 13a of the plunger 13 and generation of noise due to contact between the plunger 13 and the core 21.

Incidentally, in the instant embodiment, the flow channels 13b are formed of holes. Instead, these channels may be formed of cutouts. Further, the size of the cross sectional area of the flow channel 13b may vary appropriately, depending on e.g. the amount of cooling water, the intensity of the magnetic force applied to the plunger 13. Moreover, the number of flow channels 13b and the cross sectional shape thereof may too vary as needed. Incidentally, as described above, the magnetism generated by the solenoid 20 passes from the core 21 to the yoke 24 via the plunger 13. Taking this into consideration, it is desired that the cross sectional area through which the magnetism (magnetic flux) passes be substantially constant or progressively increase in the order from the core 21, the plunger 13 and the yoke 24.

Therefore, in view of the fact that the magnetism passes through the core 21 along the axial direction of the core 21 and flows through the plunger 13 along the outer radial direction of the plunger 13, it is preferred that the size of the flow channel 13b be determined in such a manner as follows. Namely, the cross sectional area of the portion of the plunger 13 except for the portions of the flow channels 13b at a circumferential position on a circle having the smallest radius of the circles centered about the axis of the plunger 13 and extending on the flow channels 13b should preferably be greater than the cross sectional area (the area of contact between the core 21 and the plunger 13) as seen in the axial direction of the core 21. In the above, "the cross sectional area of the portion of the plunger 13 except for the portions of the flow channels 13b at a circumferential position" refers to the cross sectional area having the value obtained by multiplying the circumferential length of the circle excluding the lengths of the portions that pass inside the flow channels 13b with the thickness of the plunger 13.

Further, in the instant embodiment, the yoke 24 is disposed to face the plunger 13 in the axial direction of the plunger 13, but no contact occurs between the plunger 13 and the yoke 24. Therefore, in view of the passage of magnetism, it is preferred that the portion of the plunger 13 which portion faces the yoke 24 be formed larger. For this reason, in the instant embodiment, the aperture shape of the flow channel 13b is determined such that the area of the portion of the plunger 13 facing the yoke 24 is greater than the area of the portion of the plunger 13 facing the core 21.

With the above-described arrangement for improving the efficiency of passage of magnetism, it is possible to reduce the magnetic force generated by the solenoid 20, thus contributing to the reduction in the current applied to the solenoid 20 and to compactization through reduction in the number of turns of the coil.

Figure 5:
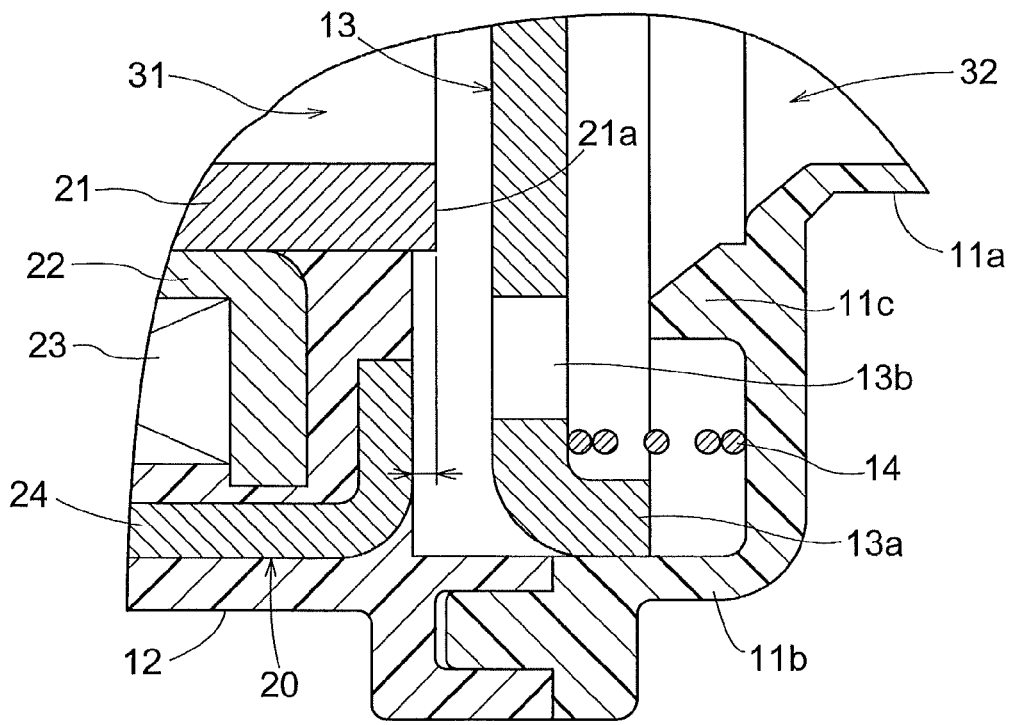
[FIG. 5] is an enlarged section view of the fluid control valve according to the present invention.

FIG. 5 is an enlarged section view of the fluid control valve 1 according to the instant embodiment. As shown, in the outer circumference of the plunger 13, there is formed the guide portion 13a disposed erect in the direction opposite to the solenoid 20 (the upper direction in the illustration). This guide portion 13a is in contact with the inner wall of the first housing 11 or the second housing 12. Therefore, when the plunger 13 moves, the guide portion 13 is placed in contact with the inner wall of the first housing 11 or the second housing 12. With this, the posture of the plunger 13 during its movement is stabilized, thereby to avoid malfunction of a valve stick or the like. Incidentally, it is not essentially required to dispose the guide portion 13a erect in the outer circumference of the plunger 13. Instead, the outer circumferential face of the plunger 13a may be configured to function as the guide portion 13a.

Further, as shown in FIG. 5, in the instant embodiment, the plunger 13 side end face of the core 21 is caused to project more toward the plunger 13 than the plunger 13 side end face of the yoke 24. With this arrangement, when the plunger 13 is urged or attracted to the core 21 side due to the urging force of the urging spring 14 or the magnetic force of the solenoid 20, the plunger 13 comes into contact with the core 21 only. That is, in this arrangement, only the plunger 13 side end face of the core 21 constitutes the valve seat 21a. With this, the sealing performance can be improved and the pressure receiving area from cooling water can be formed small. The smaller pressure receiving face means reduction in the force received from cooling water and the possibility of decreasing the magnetic force to resist it. That is, since the reduction in the pressure receiving area from cooling water allows reduction in the number of turns of the coil 23, the above arrangement can contribute to compactization of the fluid control valve 1.

Figure 6:
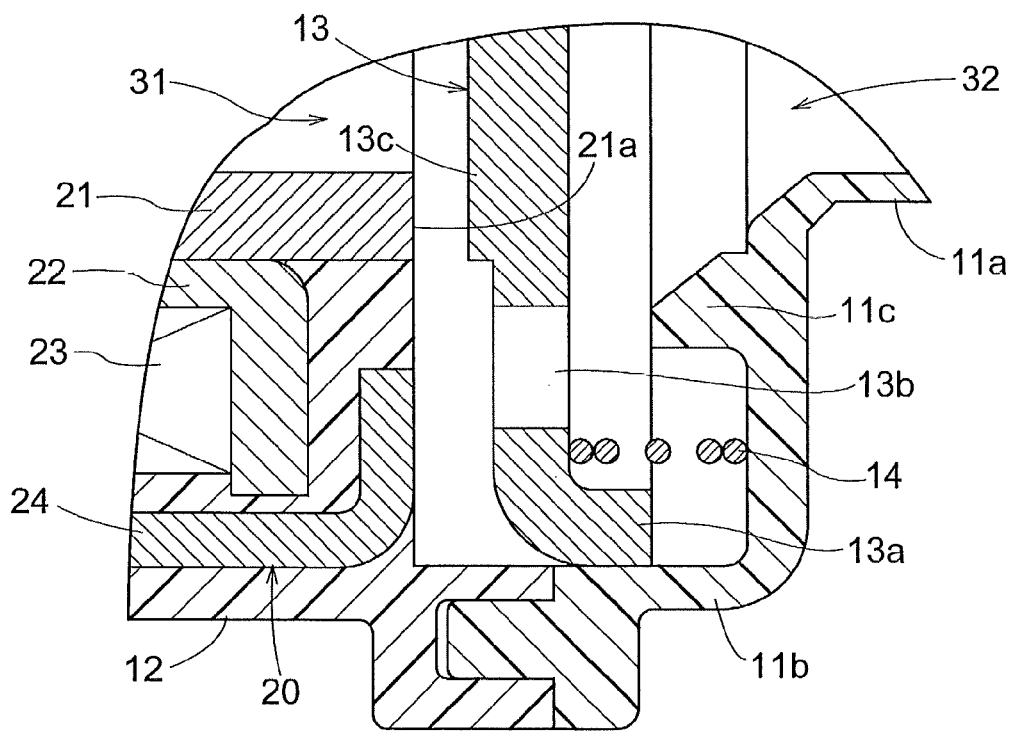
[FIG. 6] is an enlarged section view of an alternative arrangement of the fluid control valve according to the present invention.

Further, as shown in FIG. 6, the plunger 13 side end face of the core 21 may be located at a substantially same position as the plunger 13 side end face of the yoke 24 and a convex portion 13c projecting toward the core 21 may be formed in the bottom face of the plunger 13. With such arrangement as above too, like the arrangement shown in FIG. 5, only the plunger 13 side end face of the core 21 will constitute the valve seat 21a, so that the arrangement can contribute to improvement in the sealing performance and compactization of the fluid control valve.

This convex portion 13c has a cross sectional area greater at least than the cross sectional area of the inflow channel 31. In particular, if the convex portion 13c is formed like a disk centering about the axis of the core 21 and having a radius substantially equal to the radius of the core 21, it becomes possible to reduce the pressure receiving area from cooling water, so that a greater degree of firm contact can be obtained with a smaller amount of magnetic force. As a result, the solenoid 20 can be formed compact, advantageously.

Further, with the positional relationship between the core 21 and the yoke 24 may be set as shown in FIG. 5, the convex portion 13c may be formed in the bottom face of the plunger 13.

[Other Embodiment]

In the foregoing embodiment, the plunger 13 side end face of the core 21 is configured to constitute the valve seat 21a. Instead, a valve seat may be provided separately in the plunger 13 side end face of the core 21. In such case, in this valve seat too, there will be formed a flow channel communicated with the inflow channel formed in the core 21.

Industrial Applicability

The present invention is applicable to a fluid control valve for controlling the flow of fluid such as cooling water or oil in a vehicle.

REFERENCE SIGNS LIST

1: fluid control valve
2: engine
6: heater core (heat exchanger)
13: plunger (valve body)
13c: convex portion
20: solenoid
21: core
21a: valve seat
24: yoke
31: inflow channel
32: outflow channel

The invention claimed is:

1. A fluid control valve incorporated in a circulatory flow passageway for circulating fluid between an engine and a heat exchanger, the fluid control valve comprising:
   an inflow channel for introducing the fluid;
   an outflow channel for discharging the fluid;
   a valve seat;
   a valve body for blocking/allowing communication between the inflow channel and the outflow channel in association with a movement thereof into contact with or away from the valve seat;
   a solenoid configured to apply a magnetic force to the valve body, the magnetic force being generated in response to supply of electric power to the solenoid;
   wherein the inflow channel is formed through a core of the solenoid so that the core and the fluid come into contact with each other in the inflow channel;
   a guide portion disposed upright in a direction opposite to the solenoid in an outer circumference of the valve body; and
   wherein the guide portion has a thickness greater than a thickness of any other portion of the valve body in an axial direction of the valve body.

2. A fluid control valve according to claim 1, wherein the valve seat is comprised of the core.

3. A fluid control valve according to claim 1, wherein
the solenoid includes a yoke disposed radially outward as seen in an axial direction of the core; and an end face of the core on a side of the valve body protrudes more toward the valve body than an end face of the yoke on the side of the valve body.

4. A fluid control valve according to claim 1, wherein a core side end face of the valve body includes a convex portion which comes into contact with the core.

5. A fluid control valve according to claim 1, wherein the valve body includes a flow channel more radially outwards than the valve seat as seen in the axial direction of the core.

6. A fluid control valve according to claim 1, wherein in response to electric power supply to the solenoid, the solenoid generates a magnetic flux which affects the core and the valve body; and the core and the valve body are cooled as coming into direct contact with the fluid.

7. A fluid control valve according to claim 1, further comprising:

an urging element configured to urge the valve body toward the core to allow the valve body to come into contact with the valve seat when no electric power is supplied to the solenoid.

* * * * *